(12) United States Patent
Barron et al.

(10) Patent No.: US 11,713,830 B2
(45) Date of Patent: Aug. 1, 2023

(54) EROSION-RESISTANT VALVE TRIM

(71) Applicant: FISHER CONTROLS INTERNATIONAL LLC, Marshalltown, IA (US)

(72) Inventors: Kimball R. Barron, Marshalltown, IA (US); Daniel J. Eilers, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 23 days.

(21) Appl. No.: 17/037,632

(22) Filed: Sep. 29, 2020

(65) Prior Publication Data

US 2021/0095786 A1 Apr. 1, 2021

Related U.S. Application Data

(60) Provisional application No. 62/909,660, filed on Oct. 2, 2019, provisional application No. 62/909,164, filed on Oct. 1, 2019.

(51) Int. Cl.
| | |
|---|---|
| *F16K 5/18* | (2006.01) |
| *F16K 47/08* | (2006.01) |
| *F16K 27/00* | (2006.01) |
| *F16K 39/02* | (2006.01) |
| *F16K 1/00* | (2006.01) |
| *F16K 31/12* | (2006.01) |
| *F16K 1/32* | (2006.01) |
| *F16K 1/36* | (2006.01) |
| *F16K 1/54* | (2006.01) |
| *F16K 1/42* | (2006.01) |

(52) U.S. Cl.
CPC ............... *F16K 47/08* (2013.01); *F16K 5/18* (2013.01); *F16K 27/00* (2013.01); *F16K 39/022* (2013.01); *F16K 1/00* (2013.01); *F16K 1/32* (2013.01); *F16K 1/36* (2013.01); *F16K 1/42* (2013.01); *F16K 1/54* (2013.01); *F16K 31/12* (2013.01)

(58) Field of Classification Search
CPC . F16K 47/08; F16K 5/18; F16K 27/00; F16K 39/022; F16K 1/00; F16K 1/32; F16K 1/36; F16K 1/42; F16K 1/54; F16K 31/12
See application file for complete search history.

(56) References Cited

U.S. PATENT DOCUMENTS 3,880,399 A * 4/1975 Luthe .................. F16K 47/08
251/121
3,990,475 A * 11/1976 Myers .................. F16K 3/34
137/625.3
4,108,210 A * 8/1978 Luthe .................. F16K 47/08
137/625.28

(Continued)

*Primary Examiner* — Matthew W Jellett
*Assistant Examiner* — Christopher D Ballman
(74) *Attorney, Agent, or Firm* — Marshall, Gerstein & Borun LLP (57) ABSTRACT

A valve trim for use in a fluid flow control device. The valve trim includes a cage body defined by an outer cage wall and an inner cage wall coupled to the outer cage wall, the outer cage wall spaced radially outward of the inner cage wall. The valve trim also includes a plurality of first flow characterizing passages formed in the outer cage wall, and a plurality of second flow characterizing passages formed in the inner cage wall. The cage body is at least partially made of an erosion-resistant material.

23 Claims, 3 Drawing Sheets

(56) References Cited

U.S. PATENT DOCUMENTS

| | | | | |
|---|---|---|---|---|
| 4,249,574 A * | 2/1981 | Schnall | F15C 1/02 137/625.3 |
| 4,398,563 A * | 8/1983 | Kay | F16K 3/34 137/625.3 |
| 4,473,210 A * | 9/1984 | Brighton | F16K 47/045 137/625.3 |
| 4,921,014 A * | 5/1990 | Tartaglia | F16K 47/08 137/494 |
| 5,020,571 A * | 6/1991 | Tartaglia | F16K 47/08 137/625.3 |
| 5,261,453 A * | 11/1993 | Hekkert | F16K 47/02 137/614.18 |
| 6,047,734 A * | 4/2000 | Robinson | F16K 3/246 137/625.37 |
| 6,505,646 B1 * | 1/2003 | Singleton | F16K 47/08 137/625.3 |
| 6,637,452 B1 * | 10/2003 | Alman | F16K 3/243 137/244 |
| 6,766,826 B2 * | 7/2004 | Baumann | F16K 47/08 137/625.3 |
| 6,926,032 B2 * | 8/2005 | Nawaz | F16K 47/04 137/625.33 |
| 7,069,950 B1 * | 7/2006 | Bittner | F16K 47/08 137/625.37 |
| 8,596,610 B2 * | 12/2013 | Wears | F16K 47/08 251/332 |
| 9,528,632 B2 * | 12/2016 | Glaun | B33Y 10/00 |
| 9,759,348 B2 * | 9/2017 | Adams | F16K 47/08 |
| 9,851,013 B2 * | 12/2017 | Zhou | F16K 47/08 |
| 10,302,224 B2 * | 5/2019 | Kluz | F16K 47/08 |
| 10,663,083 B2 * | 5/2020 | Eilers | F16K 1/54 |
| 10,871,243 B2 * | 12/2020 | Sander | F16K 47/08 |
| 2009/0026395 A1 * | 1/2009 | Perrault | F16K 47/08 251/127 |
| 2014/0264135 A1 * | 9/2014 | Bell | F16K 47/08 251/359 |
| 2015/0252913 A1 * | 9/2015 | Yamamoto | F16K 47/08 251/121 |
| 2017/0009907 A1 * | 1/2017 | Nitta | F16K 5/04 |
| 2017/0234440 A1 * | 8/2017 | Detmers | F16K 3/267 251/118 |
| 2019/0099703 A1 * | 4/2019 | Qiu | F16K 3/267 |
| 2019/0101228 A1 * | 4/2019 | Gabriel | B33Y 80/00 |

* cited by examiner

EROSION-RESISTANT VALVE TRIM

CROSS-REFERENCE TO RELATED APPLICATIONS

The present application claims the priority benefit of U.S. Provisional Application No. 62/909,660, filed Oct. 2, 2019, and U.S. Provisional Application No. 62/909,164, filed Oct. 1, 2019. The entire disclosure of each of these applications is hereby incorporated by reference.

FIELD OF THE DISCLOSURE

The present disclosure generally relates to fluid pressure reduction devices, and, more particularly, to an erosion-resistant valve trim for use in a fluid flow control device.

BACKGROUND

In process control systems, such as distributed or scalable process control systems commonly found in chemical, petroleum, power generation, or other industrial processes, it is often necessary to reduce the pressure of a fluid. In some cases, the pressure of the fluid must be reduced significantly. In cases requiring a relatively high pressure reduction, the pressure drop ratio, which is the change in pressure divided by the inlet pressure, may be quite high.

Generally speaking, pressure reduction typically leads to increased levels of unwanted noise and/or vibration. In applications with a relatively high pressure drop ratio, these problems can be even more pronounced. In an attempt to prevent or at least reduce noise and vibration, process systems often use flow restriction devices to reduce the pressure drop ratio and also to reduce the fluid pressures. Such flow restriction devices include, for example, valve trims, diffusers, and silencers.

Known valve trims are, however, typically made of materials that are highly susceptible to high pressure drops and erosion attributable to the fluid flowing therethrough. This is particularly true when these valve trims are employed in dirty service applications (i.e., applications involving severe flow conditions, e.g., catalyst fines in refineries, magnetite in power plants, sand in oil production, in which the fluid is dirty). Indeed, when the fluid flowing through one of these valve trims is dirty (e.g., includes particulates), the fluid tends to quickly erode the valve trim. In turn, frequent maintenance is required, which can be quite costly and may necessitate that the process control system (or a portion thereof) be shutdown.

SUMMARY

In accordance with one exemplary aspect of the present invention, a valve trim for use in a fluid flow control device is provided. The valve trim includes a cage body having a first end and a second end opposite the first end. The cage body is defined by an outer cage wall and an inner cage wall coupled to the outer cage wall, the outer cage wall spaced radially outward of the inner cage wall. The valve trim also includes a fluid pressure reducing portion. The fluid pressure reducing portion includes a plurality of first flow characterizing passages formed in the outer cage wall, and a plurality of second flow characterizing passages formed in the inner cage wall. The valve trim further includes a valve seat carried by the cage body adjacent to but upstream of the second end of the cage body, such that the valve seat is isolated from the fluid pressure reducing portion.

In accordance with another exemplary aspect of the present invention, a valve trim for use in a fluid flow control device is provided. The valve trim includes a cage body defined by an outer cage wall and an inner cage wall coupled to the outer cage wall, the outer cage wall spaced radially outward of the inner cage wall. The valve trim also includes a plurality of first flow characterizing passages formed in the outer cage wall, and a plurality of second flow characterizing passages formed in the inner cage wall. The cage body is at least partially made of an erosion-resistant material.

In accordance with another exemplary aspect of the present invention, a fluid flow control device is provided. The fluid flow control device includes a valve body including a valve body inlet, a valve body outlet, and a passageway extending between the valve body inlet and the valve body outlet. The fluid flow control device also includes a valve trim at least partially disposed in the passageway of the valve body. The valve trim includes a cage body defined by an outer cage wall and an inner cage wall coupled to the outer cage wall, the outer cage wall spaced radially outward of the inner cage wall. The valve trim also includes a plurality of first flow characterizing passages formed in the outer cage wall, and a plurality of second flow characterizing passages formed in the inner cage wall. The cage body is at least partially made of an erosion-resistant material.

In accordance with another exemplary aspect of the present invention, a method of manufacturing a valve trim for use in a fluid flow control device is provided. The method includes creating an outer cage element using an additive manufacturing technique, the outer cage element including a plurality of first flow characterizing passages. The method also includes creating an inner cage element using the additive manufacturing technique, the inner cage element formed of an erosion-resistant material and including a plurality of second flow characterizing passages. The method further includes coupling the outer cage element to the inner cage element, thereby forming a cage body having an outer wall defined by the outer cage element and an inner wall defined by the inner cage element.

In further accordance with any one or more of the foregoing exemplary aspects of the present invention, a valve trim, a fluid flow control device, or a method of manufacturing a valve trim for use in a fluid flow control device can further include, in any combination, any one or more of the following preferred forms.

In one preferred form, the cage body extends between the first end and the second end along a cage axis, and each first flow characterizing passage of the plurality of first flow characterizing passages extends along a first axis parallel to the cage axis.

In another preferred form, each second flow characterizing passage of the plurality of second flow characterizing passages extends along a second axis parallel to the cage axis and the first axis.

In another preferred form, the plurality of first flow characterizing passages are spaced from and surround the plurality of second flow characterizing passages, respectively.

In another preferred form, the cage body is at least partially made of an erosion-resistant material. The inner cage wall can be made of the erosion-resistant material. Both the inner cage wall and the outer cage wall can be made of the erosion-resistant material.

In another preferred form, the cage body is defined by an inner cage element and an outer cage element coupled to the inner cage element, the inner cage element including the inner wall, and the outer cage element including the outer wall.

In another preferred form, an upper cage element is coupled to the inner cage element and the outer cage element. The upper cage element can be made of a metallic material.

In another preferred form, the plurality of first flow characterizing passages define a first flow area, and the plurality of second flow characterizing passages define a second flow area less than the first flow area.

In another preferred form, a valve seat is carried by the cage body and a valve plug includes a seating surface movably disposed within the cage body relative to the valve seat to control fluid flow through the passageway of the valve body.

In another preferred form, a bonnet is coupled to the valve body, wherein the bonnet has a portion that directly engages the upper cage portion.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is directed to a valve trim that addresses these and other problems with the conventional valve trims. The valve trim disclosed herein is at least partially manufactured using an additive manufacturing technique, such that the valve trim can be easily and cost-effectively partially (or entirely) made of an erosion-resistant material. Moreover, the valve trim disclosed herein has a protected valve seating surface, i.e., the valve seating surface is not exposed to a significant pressure drop when fluid is flowing through the valve trim. Indeed, the valve seating surface (i.e., the shutoff port) of the valve trim is isolated from the throttling portion of the valve trim (where fluid pressure reduction occurs). Thus, when the valve trim is employed in dirty service and/or high pressure drop applications, the valve trim prevents or at least reduces noise and vibration (by reducing the pressure drop ratio and reducing the fluid pressures) while substantially resisting or withstanding the erosive conditions described above. At the very least, the valve trim can substantially resist or withstand erosion for a longer period of time than it conventionally would. Accordingly, the valve trim disclosed herein has a longer working life (thereby necessitating less frequent maintenance) and, at the same time, is easier and less costly to manufacture than conventional valve trims.

As used herein, the phrase additive manufacturing technique refers to any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

Figure 1:
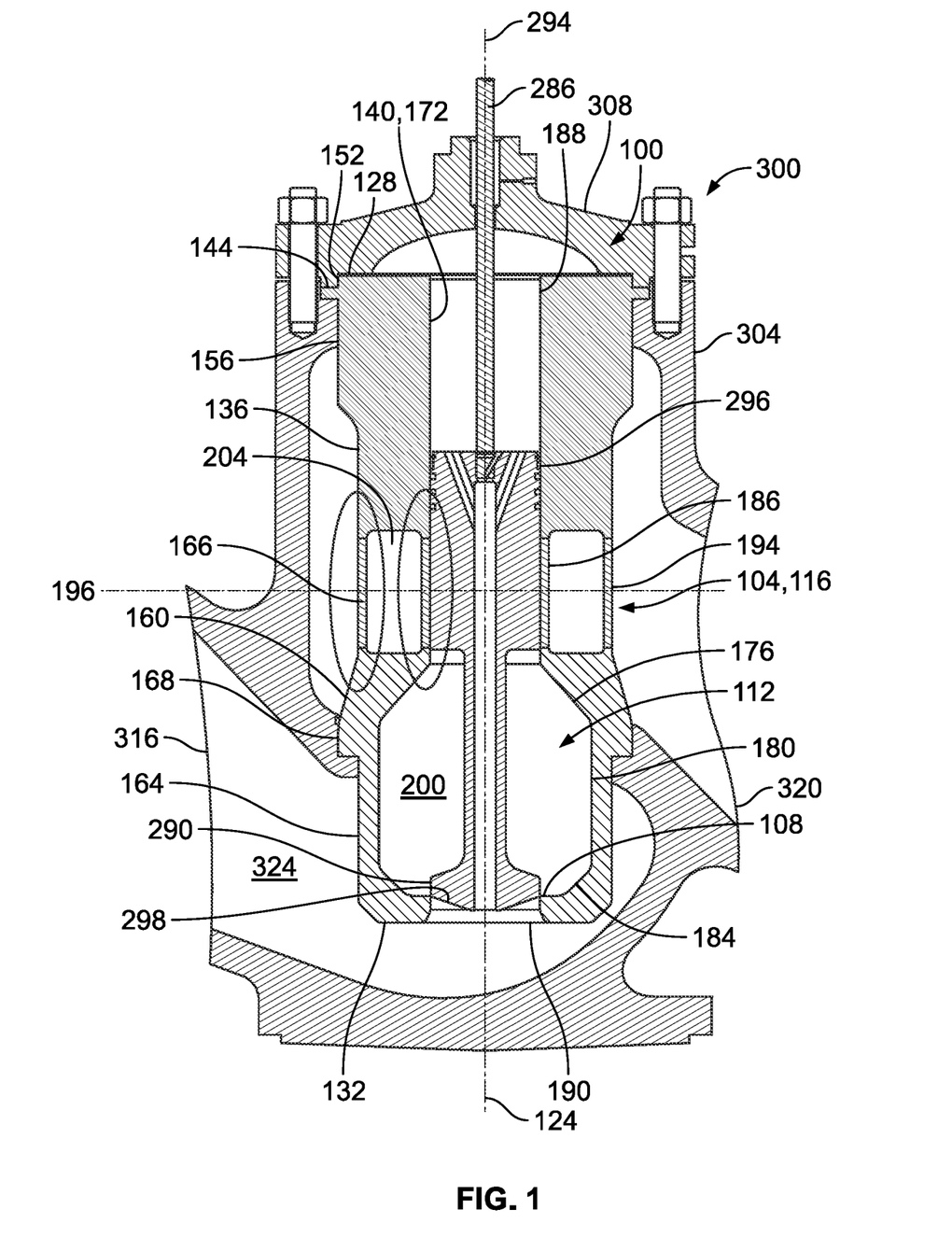
FIG. 1 is a partial cross-sectional view of a valve trim constructed in accordance with the teachings of the present disclosure and disposed in a fluid flow control device, the fluid flow control device in a closed position.
Figure 2:
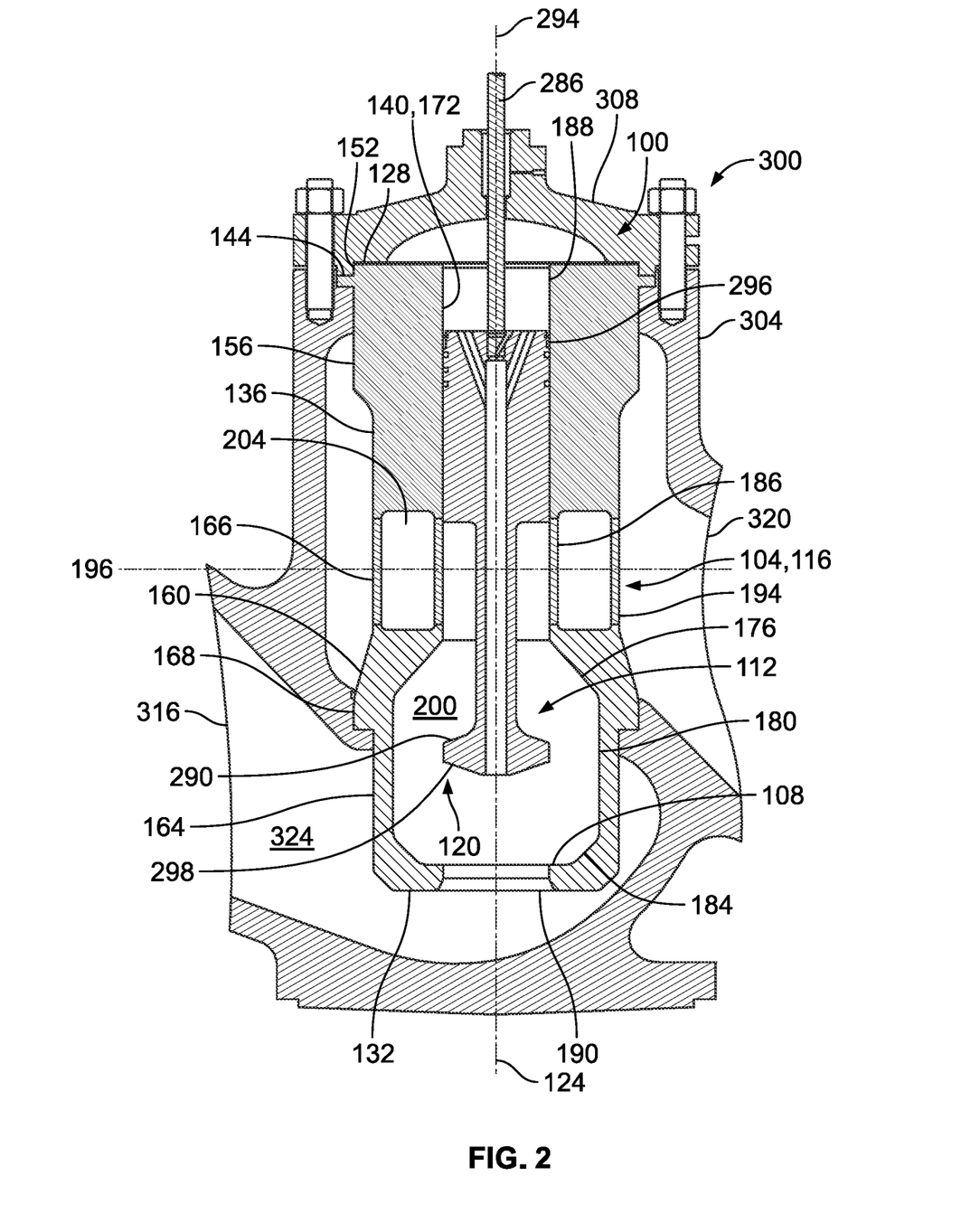
FIG. 2 is similar to FIG. 1, but shows the fluid flow control device in a fully open position.

FIGS. 1 and 2 illustrate one example of a valve trim 100 constructed in accordance with the teachings of the present disclosure and for use in a fluid flow control device. The valve trim 100 is a multi-stage valve trim that is configured to provide multi-stage fluid pressure reduction in dirty service and/or high pressure drop applications involving compressible fluid (e.g., gas), though it will be appreciated that the valve trim 100 can be used to reduce fluid pressure in clean applications as well. The valve trim 100 generally includes a valve cage 104, a valve seat 108 carried by the valve cage 104, and a control element 112 movably disposed within the valve cage 104 relative to the valve seat 108 to control fluid flow through the valve trim 100.

The valve cage 104 includes a unitary body 116 and an internal passageway 120 that is entirely contained within the unitary body 116. The unitary body 116 is at least partially made using an additive manufacturing technique, such that the unitary body 116 can be partially (or wholly) made of or manufactured from an erosion-resistant material (e.g., Ultimet, Alloy 6, high-hardness stainless steels such as 420C, 440C, and the like, high-hardness steels such as tool steels, nickel alloys such as Inconel 718, K-Monel, and the like, tungsten carbide, or a ceramic material). In turn, at least part of the unitary body 116 (e.g., the part of the unitary body 116 exposed to fluid flow) is substantially resistant to erosion from fluid flowing therethrough. In some examples, the unitary body 116 is wholly made of or from the erosion-resistant material. In other examples, however, the unitary body 116 can be made of or from two or more different materials, including the erosion-resistant material and one or more suitable materials (e.g., stainless steel, aluminum). As will be discussed in greater detail below, the internal passageway 120 defines a plurality of fluid pressure reduction stages that facilitate the desired fluid pressure reduction.

The unitary body 116 in this version generally extends along a longitudinal axis 124 from a first end 128 to a second end 132 opposite the first end 128. The unitary body 116 includes an outer wall 136, an inner wall 140, a flange 144, and the valve seat 108. In other examples, however, the unitary body 116 may include more or less, and/or different, components. As an example, the unitary body 116 may not include the seat 108, which may, for example, instead be removably coupled to the unitary body 116.

The outer wall 136 is generally arranged to engage a valve body of a fluid flow control device when the valve trim 100 is disposed in the fluid flow control device. The outer wall 136 in this example is formed from a plurality of differently sized wall portions, namely a first wall portion 152, a second wall portion 156, a third wall portion 160, and a fourth wall portion 164, as well as a plurality of first flow characterizing passages 166 circumferentially arranged in the outer wall 136 (only two of which are shown). The first wall portion 152 extends between the first end 128 and the flange 144 along an axis parallel to the longitudinal axis 124. The second wall portion 156 extends downwardly (at least in FIGS. 1 and 2) from the flange 144 and then inwardly toward the second end 132 (i.e., at an angle relative to the longitudinal axis 124) before terminating at or prior to the plurality of first flow characterizing passages 166. The third wall portion 160 extends downwardly, along an axis parallel to the longitudinal axis 124, from the plurality of first flow characterizing passages 166 and then outwardly toward a shoulder 168 arranged to engage a portion of the valve body. The fourth wall portion 164 extends downwardly, along an axis parallel to the longitudinal axis 124, from the third wall portion 160 to the second end 132. The fourth wall portion 164 has a diameter that is less than the diameter of the third wall portion 160. In other examples, however, the outer wall 136 can be formed from more or less, or differently sized, wall portions in order to accommodate and engage differently sized valve bodies.

Meanwhile, the inner wall 140 is spaced radially inwardly of the outer wall 136. The inner wall 140 in this example is also formed from a plurality of differently sized wall portions, namely a first wall portion 172, a second wall portion 176, a third wall portion 180, and a fourth wall portion 184, as well as a plurality of second flow characterizing passages 186 circumferentially arranged in the inner wall 140 (only two of which are shown). The first wall portion 172 extends between the first end 128 and the plurality of second flow characterizing passages 186 along an axis parallel to the longitudinal axis 124, and defines a bore 188 that is sized to receive the control element 112 therein. The second wall portion 176 extends downwardly (at least in FIGS. 1 and 2), along an axis parallel to the longitudinal axis 124, from below the plurality of second flow characterizing passages 186 and then outwardly toward the second end 132 (i.e., at an angle relative to the longitudinal axis 124). The third wall portion 180 extends downwardly, along an axis parallel to the longitudinal axis 124, from the second wall portion 176, such that the third wall portion 180 has a diameter that is larger than a diameter of the first wall portion 172. The fourth wall portion 184 extends downwardly from the third wall portion 180 and inwardly toward the second end 132 (i.e., at an angle relative to the longitudinal axis 124). Thus, the fourth wall portion 184 has a diameter that is less than the diameter of the third wall portion 180. In other examples, however, the inner wall 140 can be formed from more or less, or differently sized, wall portions.

Because the outer wall 136 is spaced radially outward of the inner wall 140, the outer wall 136 is necessarily larger than the inner wall 140, and the plurality of first flow characterizing passages 166 (formed in the outer wall 136) define a first flow area that is larger than a second flow area defined by the plurality of second flow characterizing passages 186 (formed in the inner wall 140). The ratio of the first flow area to the second flow area may, for example, be 2:1, 3:1, 4:1 or some other ratio suitable for the given application. In any case, the larger first flow area helps to provide back pressure to further help to reduce noise and vibration. Moreover, because the outer wall 136 is spaced radially outward of the inner wall 140, the plurality of first flow characterizing passages 166 are also spaced radially outward of the plurality of second flow characterizing passages 186. Preferably, and as illustrated in FIGS. 1 and 2, the plurality of first flow characterizing passages 166 surround the plurality of second flow characterizing passages 186.

Figure 3:
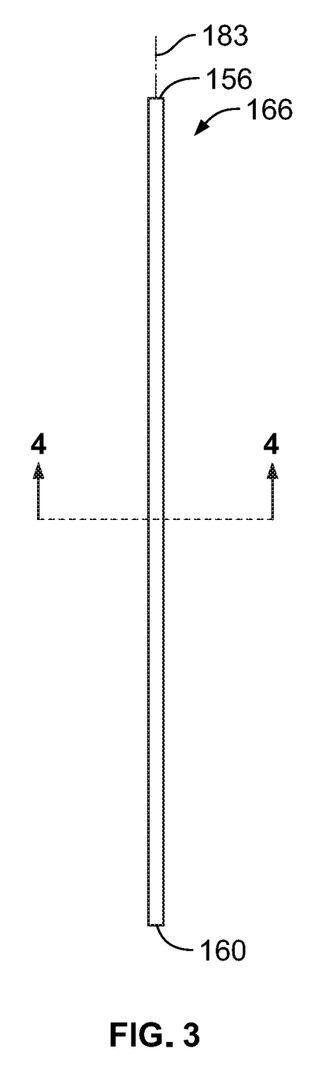
FIG. 3 is a close-up view of one of the flow characterizing passages of the valve trim of FIG. 1.
Figure 4:
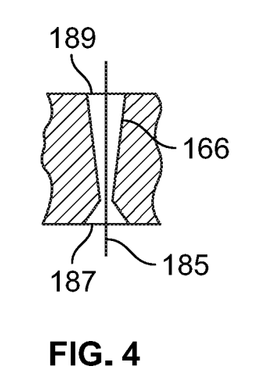
FIG. 4 is a cross-sectional view of FIG. 3 taken along line 4-4.

As illustrated in FIGS. 1 and 2, in this example each first flow characterizing passage 166 preferably takes the form of a first slot. As best illustrated in FIG. 3, which depicts one of the first slots in isolation, each first slot in this example has a constant width in the vertical or longitudinal direction (i.e., along a vertical axis 183 parallel to the longitudinal axis 124), with a first, or upper, end of each first slot defined by the second wall portion 156 of the outer wall 136 and a second, or bottom, end of each first slot defined by the third wall portion 160 of the outer wall 136. Meanwhile, as best illustrated in FIG. 4, each first slot in this example has a variable width in the horizontal or transverse direction (i.e., along a horizontal axis 185 traverse to the vertical axis 183 and to the longitudinal axis 124). More particularly, each first slot in this example has a tapered flow path that converges from a slot inlet 187 to an intermediate portion, where the slot has a minimum width, and then diverges from the intermediate portion to a slot outlet 189 (which is positioned radially outward of the slot inlet 187 and is in fluid communication with a fluid passageway of the fluid flow control device), such that the slot outlet 189 has a width larger than the slot inlet 187 (though the width of the slot outlet 189 can instead be smaller than or equal to the width of the slot inlet 187). These tapered flow paths help to reduce noise of the fluid flowing therethrough and to control capacity of the valve trim 100.

Likewise, each second flow characterizing passage 186 also preferably takes the form of a second slot. Each second slot in this example has a shape and size that is identical to each of the first slots. Thus, each second slot in this example also has a constant width in the vertical or longitudinal direction, with a first, or upper, end of each second slot defined by the first wall portion 172 of the inner wall 140 and a second, or bottom, end of each second slot defined by the second wall portion 176 of the inner wall 140. Similarly, each second slot in this example also has a variable width in the horizontal or transverse direction, with each second slot having a tapered flow path that is substantially identical to the tapered flow path of each first slot. As with the tapered flow paths of the first slots, the tapered flow paths of the second slots help to reduce noise of the fluid flowing therethrough and to control capacity of the valve trim 100.

Each of the slots 166, 186 preferably has a width in the vertical or longitudinal direction equal to 1/16", though one or more of the slots 166, 186 can have a larger or smaller width in this direction, such that the slots 166 and/or the slots 186 can have different widths in this direction. In other examples, however, the first flow characterizing passages 166 and/or the second flow characterizing passages 186 can have a different shape and/or size than what is illustrated herein. In one such example, the first flow characterizing passages 166 and/or the second flow characterizing passages 186 can instead take the form of drilled or otherwise formed apertures in the outer and inner walls 136, 140, respectively.

The flange 144 extends outwardly from the outer wall 136. In this example, the flange 144 extends outwardly from the outer wall 136 at a position immediately adjacent to but spaced from the first end 128. However, in other examples, the flange 144 may extend outwardly from the outer wall 136 at a position closer to or further from the first end 128.

The flange 144 is thus arranged to engage both the valve body and a bonnet of the fluid flow control device when the valve trim 100 is disposed in the fluid flow control device. The valve seat 108, on the other hand, is carried by and extends inwardly from the inner wall 140. In this example, the valve seat 108 extends inwardly from the fourth wall portion 184 of the inner wall 140 at a position immediately adjacent to but spaced from the second end 132 of the unitary body 116. As such, the valve seat 108 is disposed within the internal passageway 120, but at a position that is isolated from the areas where pressure reduction occurs, thereby protecting the valve seat 108. In other examples, the valve seat 108 may extend inwardly from the inner wall 140 at a position closer to or further from the second end 132. In any case, the valve seat 108 is positioned to selectively receive a portion of the control element 112 to open or close the internal passageway 120, as will be described in greater detail below.

In some examples, the unitary body 116 can be entirely made using the additive manufacturing technique, such that the components of the unitary body 116—the outer wall 136, the inner wall 140, the flange 144, and the valve seat 108—form a monolithic body. In one such example, the monolithic body 116 can be wholly printed or otherwise made from the erosion-resistant material, such that the components of the unitary body 116—the outer wall 136, the inner wall 140, the flange 144, and the valve seat 108—are made from the same erosion-resistant material. In another such example, the monolithic body 116 can be made from two or more materials, e.g., the erosion-resistant material and another, different erosion-resistant material, or the erosion-resistant material and a non-erosion-resistant material (e.g., stainless steel, aluminum, various alloys). In other examples, the unitary body 116 can be formed of two or more elements that are separately manufactured (using the additive manufacturing technique or a conventional manufacturing technique) and then joined together (i.e., to form a non-monolithic body). In one such example, the unitary body 116 can be formed by manufacturing an outer cage element (that includes the outer wall 136) using the additive manufacturing technique, manufacturing an inner cage element (that includes the inner wall 140) using the additive manufacturing technique, and coupling the outer cage element to the inner cage element. The outer cage element can, for example, be clamped, welded, threaded, dovetailed, or coupled to the inner cage element in another suitable manner. Optionally, the outer cage element can itself be formed of two or more different segments that are separately manufactured and then coupled together (e.g., via a printed dovetail joint). In another such example, the unitary body 116 can be further formed by manufacturing an upper cage element (that includes, for example, the first and second wall portions 152, 156 of the outer wall 136, and a portion of the first wall portion 172 of the inner wall 140) and then coupling the upper cage element to the outer cage element and the inner cage element in any of the ways described above. In yet another such example, the unitary body 116 can be formed by manufacturing a lower cage element (that includes, for example, the valve seat 108) and then coupling the lower cage element to the outer cage element and the inner cage element.

With reference back to FIGS. 1 and 2, the valve cage 104 also includes a cage inlet 190 and a cage outlet 194. In this example, the cage inlet 190 is formed in the unitary body 116 at the second end 132 of the unitary body 116, such that the cage inlet 190 extends along the longitudinal axis 124. In other examples, however, the cage inlet 190 may be formed in a different location and/or may extend along a different axis than the longitudinal axis 124 (e.g., may extend along an axis that is transverse to the longitudinal axis 124). In this example, the cage outlet 194 is defined by the plurality of first characterizing passages 166, such that the cage outlet 194 is formed in the outer wall 136 of the unitary body 116 at a position between the first and second ends 128, 132 of the unitary body 116. The cage outlet 194 thus extends along an axis 196 that is transverse to the longitudinal axis 124. In other examples, however, the cage outlet 194 may be formed in a different location and/or may extend along a different axis than the axis 196 (e.g., along the longitudinal axis 124).

The valve cage 104 also includes a plurality of chambers defined by the unitary body 116 and extending between the cage inlet 190 and the cage outlet 194. In this example, the valve cage 104 includes first and second chambers 200, 204 defined by different portions of the unitary body 116. More particularly, the first chamber 200 is defined by the second, third, and fourth wall portions 176, 180, 184 of the inner wall 140, and the second chamber 204 is defined by the area between the outer wall 136 and the inner wall 140 between the bore 188 and the cage outlet 194. Thus, the first chamber 200 is immediately adjacent and downstream of the cage inlet 190 within the unitary body 116, and the second chamber 204 is downstream of the first chamber 200 and immediately adjacent and upstream of the cage outlet 194 within the unitary body 116. Moreover, the second chamber 204 is in fluid communication with the slot inlets 187. As best illustrated in FIG. 2, the first chamber 200 defines a first volume and the second chamber 204 defines a second volume that is smaller than the first volume. In other examples, however, the valve cage 104 may include more or less chambers, the first and second chambers 200, 204 may be defined by different portions of the valve cage 104, and/or the first and second chambers 200, 204 may be sized differently.

As discussed above, the internal passageway 120 is entirely contained within the unitary body 116. The internal passageway 120 extends between the cage inlet 190 and the cage outlet 194. In this example, the internal passageway 120 is defined or formed by the first chamber 200, the bore 188, the plurality of first flow characterizing passages 166, and the second chamber 204, with each of these features sized to achieve the desired amount of fluid pressure reduction for the given application. In other examples, however, the internal passageway 120 may be defined or formed by more, less, or different components.

With continued reference to FIGS. 1 and 2, details of the control element 112 will now be described. The control element 112, which can be made of one or more suitable materials, such as, for example, stainless steel, aluminum, and various alloys (e.g., nickel-chromium alloy), generally includes an elongated plug stem 286 and a valve plug 290 coupled to the elongated plug stem 286 at one end of the elongated plug stem 286. The elongated plug stem 286 and the valve plug 290 may be integrally formed with one another, e.g., using an additive manufacturing technique, or may be separately formed and coupled to one other. The valve plug 290 in this example is balanced, though it need not be. In any case, when the valve plug 290 is movably disposed within the valve cage 104, the elongated plug stem 286 extends along a longitudinal axis 294 that is co-axial with the longitudinal axis 124. Meanwhile, the valve plug 290 has a body portion 296 that is slidably arranged within the bore 188 and engages the inner wall 140 of the valve cage 104, and a sealing portion having a sealing surface 298 that is arranged to selectively engage the valve seat 108 of the valve cage 104 to open or sealingly close the cage inlet 190 (and, more generally, to open or sealingly close the valve trim 100, respectively). Finally, it will be appreciated that the control element 112 also includes one or more sealing elements coupled to the valve plug 290 in order to effectuate a seal between an outer surface of the valve plug 290 and an inner surface of the inner wall 140 of the valve cage 104.

FIGS. 1 and 2 also illustrate the valve trim 100 disposed in one example of a fluid flow control device 300 constructed in accordance with the teachings of the present disclosure (only a portion of which is illustrated for clarity). Briefly, the fluid flow control device 300 includes a valve body 304 and a bonnet 308 coupled to the valve body 304, with the elongated plug stem 286 disposed in the valve body 304 and the bonnet 308. The valve body 304 defines an inlet 316, an outlet 320, and a fluid flow passageway 324 that includes between the inlet 316 and the outlet 320. In this example, the inlet 316 extends along an inlet axis (which is perpendicular to the axes 124, 294) and the outlet 320 extends along an outlet axis that is parallel to the inlet axis, though in other examples, the outlet axis may be non-parallel (e.g., perpendicular) to the inlet axis. The elongated plug stem 286 has one end coupled to an actuator (not shown), such that the actuator is operatively coupled to the valve plug 290 (via the stem 286) to control the position of the valve plug 290 within the valve cage 104, which in turn controls fluid flow through the internal passageway 120 and, more generally, the fluid flow passageway 324.

When the valve trim 100 is disposed in the fluid flow control device 300, the valve cage 104 engages different portions of the valve body 304 and the bonnet 308, and the valve plug 290 is movably disposed within the valve cage 104. More particularly, the flange 144 of the valve cage 104 engages both a first portion of the valve body 304 and a portion of the bonnet 308, and the shoulder 168 of the valve cage 104 engages a second portion of the valve body 304 that is closer to the cage inlet 190 than the first portion. Thus, the valve cage 104 is clamped in position by the valve body 304 and the bonnet 308. In other examples, however, different portions of the valve cage 104 may engage these or other portions of the valve body 304 and/or the bonnet 308. In any case, with the valve cage 104 so disposed, a substantial portion of the valve cage 104 is disposed within the fluid flow passageway 324, thereby providing ample volume for fluid expansion (and pressure reduction).

When the fluid flow control device 300 is in operation (with the valve trim 100 disposed therein), the valve plug 290 is movable (via the stem 286 and the actuator coupled thereto) between a fully closed position (shown in FIG. 1) and a fully open position (shown in FIG. 2) to close or open the internal passageway 120 and, more generally, the fluid flow passageway 324. When the valve plug 290 is in the fully closed position shown in FIG. 1, the sealing surface 298 of the valve plug 290 sealingly engages the valve seat 108 of the valve cage 104, thereby closing the cage inlet 190. In turn, fluid is preventing from flowing through the internal passageway 120, such that fluid is preventing from flowing from the inlet 316 to the outlet 320 via the fluid flow passageway 324. When, however, the valve plug 290 is moved from this fully closed position to the fully open position shown in FIG. 2, the valve plug 290 is moved toward the first end 128 of the unitary body 116. This moves the body portion 296 upward (when viewed in FIG. 2), along the inner wall 140, thereby exposing some (and eventually all) of the plurality of second flow characterizing passages 186, and moves the sealing surface 298 away from the valve seat 108, thereby opening the cage inlet 190. In turn, fluid is allowed to flow through the internal passageway 120, such that fluid is allowed to flow from the inlet 316 to the outlet 320 via the fluid flow passageway 324.

When the valve plug 290 is in its fully open position, fluid that has entered the valve body 304 via the inlet 316 flows into the valve cage 104 via the cage inlet 190. In many cases, though not always, the fluid entering the cage inlet 190 will have a high pressure. The fluid passes through the cage inlet 190 and past the valve seat 108 without experiencing any significant pressure drop (such that the valve seat 108 is protected). The fluid is then forced into the first chamber 200, which allows the fluid to expand, thereby reducing the pressure of the fluid (i.e., a first pressure reduction stage). The fluid is next forced into the bore 188, which forces the fluid to flow radially inwardly, away from the outer wall 136 of the valve cage 104, thereby further reducing the pressure of the fluid (i.e., a second pressure reduction stage). The fluid is then forced to flow through the plurality of second flow characterizing passages 186, thereby further reducing the pressure of the fluid (i.e., a third pressure reduction stage). After passing through the plurality of second flow characterizing passages 186, the fluid is forced to flow into the second chamber 204, which allows the fluid to again expand, thereby further reducing the pressure of the fluid (i.e., a fourth pressure reduction stage). At this point, the fluid is forced through the plurality of first flow characterizing passages 166 (i.e., the cage outlet 194), thereby further reducing the pressure of the fluid (i.e., a fifth pressure reduction stage), such that the fluid leaves the valve cage 104 and flows toward the outlet 320 of the valve body 304. In this manner, the fluid leaving the valve cage 104 has a lower pressure than the fluid did when entering the valve cage 104.

Finally, while the valve trim 100 in this example is a flow up valve trim (because fluid flows axially upward through the internal passageway 120), the valve trim 100 can, in other examples, be a flow down valve trim (wherein fluid would flow axially downward through the internal passageway 120). In one such example, the valve trim 100 may be configured so that the cage inlet 190 is at or proximate to the first end 128 and the cage outlet 194 is at or proximate to the second end 132. In addition, the valve seat 108 may be positioned elsewhere in the valve cage 104, in which case the sealing surface 298 of the valve plug 290 may be moved to selectively sealingly engage the re-positioned valve seat 108.

Preferred aspects of this invention are described herein, including the best mode or modes known to the inventors for carrying out the invention. Although numerous examples are shown and described herein, those of skill in the art will readily understand that details of the various aspects need not be mutually exclusive. Instead, those of skill in the art upon reading the teachings herein should be able to combine one or more features of one aspect with one or more features of the remaining aspects. Further, it also should be understood that the illustrated aspects are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspect or aspects of the invention, and do not pose a limitation on the scope of the invention. No language in the specification should be construed as indicating any non-claimed element as essential to the practice of the invention.

The invention claimed is:

1. A valve trim for use in a fluid flow control device, the valve trim comprising:
a cage body having a first end, a second end opposite the first end, the cage body defined by an outer cage wall and an inner cage wall coupled to the outer cage wall, the outer cage wall spaced radially outward of the inner cage wall;
a fluid pressure reducing portion, comprising:
a plurality of first flow characterizing passages formed in the outer cage wall;
a plurality of second flow characterizing passages formed in the inner cage wall; and
a pressure reducing chamber defined between the outer cage wall and the inner cage wall such that the pressure reducing chamber is fluidly connected to each of the plurality of first flow characterizing passages and is fluidly connected to each of the plurality of second flow characterizing passages; and
a valve seat carried by the cage body downstream of but adjacent to the second end of the cage body, such that the valve seat is isolated from the fluid pressure reducing portion.

2. The valve trim of claim 1, wherein the cage body extends between the first end and the second end along a cage axis, and wherein each first flow characterizing passage of the plurality of first flow characterizing passages extends vertically along a first axis parallel to the cage axis.

3. The valve trim of claim 2, wherein each second flow characterizing passage of the plurality of second flow characterizing passages extends vertically along a second axis parallel to the cage axis and the first axis.

4. The valve trim of claim 1, wherein the plurality of first flow characterizing passages are spaced from and surround the plurality of second flow characterizing passages, respectively.

5. The valve trim of claim 1, wherein the cage body is at least partially made of an erosion-resistant material.

6. The valve trim of claim 1, wherein the cage body is defined by an inner cage element and an outer cage element coupled to the inner cage element, the inner cage element comprising the inner wall, and the outer cage element comprising the outer wall.

7. The valve trim of claim 6, further comprising an upper cage element coupled to the inner cage element and the outer cage element, wherein the upper cage element is made of a metallic material.

8. The valve trim of claim 1, wherein the valve seat is integrally formed with the outer and inner cage walls such that the outer cage wall, the inner cage wall, and the valve seat form a monolithic structure.

9. The valve trim of claim 1, further comprising a shoulder adapted to engage a portion of a valve body of the fluid flow control device, the shoulder arranged between the first and second ends and disposed entirely radially outward of the valve seat.

10. A valve trim for use in a fluid flow control device, the valve trim comprising:
a cage body defined by an outer cage wall and an inner cage wall coupled to the outer cage wall, the outer cage wall spaced radially outward of the inner cage wall;
a plurality of first flow characterizing passages formed in the outer cage wall; and
a plurality of second flow characterizing passages formed in the inner cage wall,
wherein the cage body is at least partially made of an erosion-resistant material,
wherein each of the plurality of first flow characterizing passages and each of the plurality of the plurality of second flow characterizing passages comprise a tapered slot that converges from a slot inlet to an intermediate slot portion and diverges from the intermediate slot portion to a slot outlet, and
wherein the plurality of second flow characterizing passages are identical to the plurality of first flow characterizing passages.

11. The valve trim of claim 10, wherein the cage body extends between a first end and a second end opposite the first end along a cage axis, and wherein each first flow characterizing passage of the plurality of first flow characterizing passages extends vertically along a first axis parallel to the cage axis.

12. The valve trim of claim 11, wherein each second flow characterizing passage of the plurality of second flow characterizing passages extends vertically along a second axis parallel to the cage axis and the first axis.

13. The valve trim of claim 10, wherein the plurality of first flow characterizing passages are spaced from and surround the plurality of second flow characterizing passages, respectively.

14. The valve trim of claim 10, wherein the inner cage wall is made of the erosion-resistant material.

15. The valve trim of claim 14, wherein both the inner cage wall and the outer cage wall are made of the erosion-resistant material.

16. The valve trim of claim 10, wherein the cage body is defined by an inner cage element and an outer cage element coupled to the inner cage element, the inner cage element comprising the inner wall, and the outer cage element comprising the outer wall.

17. The valve trim of claim 16, further comprising an upper cage element coupled to the inner cage element and the outer cage element, wherein the upper cage element is made of a metallic material.

18. The valve trim of claim 10, further comprising a shoulder adapted to engage a portion of a valve body of the fluid flow control device, the shoulder arranged between the first and second ends and disposed entirely radially outward of the valve seat.

19. A fluid flow control device, comprising:
a valve body comprising a valve body inlet, a valve body outlet, and a passageway extending between the valve body inlet and the valve body outlet; and
a valve trim at least partially disposed in the passageway of the valve body, the valve trim comprising:
a cage body defined by an outer cage wall and an inner cage wall coupled to the outer cage wall, the outer cage wall spaced radially outward of the inner cage wall, the cage body comprising a first end, a second end opposite the first end, and a shoulder configured to engage a portion of the valve body, wherein the shoulder is arranged between the first and second ends;
a valve seat carried by the cage body at a positon upstream of the shoulder;
a plurality of first flow characterizing passages formed in the outer cage wall; and
a plurality of second flow characterizing passages formed in the inner cage wall, wherein the cage body is at least partially made of an erosion-resistant material, and wherein the shoulder is disposed entirely radially outward of the valve seat.

20. The fluid flow control device of claim 19, further comprising a valve plug comprising a seating surface movably disposed within the cage body relative to the valve seat to control fluid flow through the passageway of the valve body.

21. The fluid flow control device of claim 20, further comprising a bonnet coupled to the valve body, wherein the bonnet has a portion that directly engages an upper cage portion of the cage body.

22. The fluid flow control device of claim 19, wherein the valve seat is carried by the cage body downstream of but adjacent to the second end of the cage body.

23. A method of manufacturing a valve trim for use in a fluid flow control device, the method comprising:
   creating an outer cage element using an additive manufacturing technique, the outer cage element comprising a plurality of first flow characterizing passages;
   creating an inner cage element using the additive manufacturing technique, wherein the inner cage element is formed of an erosion-resistant material and comprises a plurality of second flow characterizing passages; and
   coupling the outer cage element to the inner cage element, thereby forming a cage body having an outer wall defined by the outer cage element, an inner wall defined by the inner cage element, and a pressure reducing chamber defined between the outer wall and the inner wall such that the pressure reducing chamber is fluidly connected to each of the plurality of first flow characterizing passages and fluidly connected to each of the plurality of second flow characterizing passages,
   wherein each of the plurality of first flow characterizing passages and each of the plurality of second flow characterizing passages comprise a tapered slot that converges from a slot inlet to an intermediate slot portion and diverges from the intermediate slot portion to a slot outlet, and
   wherein the plurality of second flow characterizing passages are identical to the plurality of first flow characterizing passages.

* * * * *

UNITED STATES PATENT AND TRADEMARK OFFICE
CERTIFICATE OF CORRECTION

PATENT NO. : 11,713,830 B2
APPLICATION NO. : 17/037632
DATED : August 1, 2023
INVENTOR(S) : Kimball R. Barron et al.

Page 1 of 1

It is certified that error appears in the above-identified patent and that said Letters Patent is hereby corrected as shown below:

In the Specification

At Column 3, Line 32, "position; and" should be -- position. --.

In the Claims

At Column 12, Line 2, "the plurality of the plurality of" should be -- the plurality of --.

At Column 12, Line 57, "positon" should be -- position --.

Signed and Sealed this
Twenty-second Day of October, 2024

Katherine Kelly Vidal
*Director of the United States Patent and Trademark Office*